United States Patent
Burtis

[11] 3,758,932
[45] Sept. 18, 1973

[54] TUBING FLARING TOOL
[75] Inventor: Wilson A. Burtis, Westminster, Calif.
[73] Assignee: Crane Co.
[22] Filed: Mar. 3, 1972
[21] Appl. No.: 231,515

Related U.S. Application Data
[62] Division of Ser. No. 2,470, Jan. 13, 1970, Pat. No. 3,647,246.

[52] U.S. Cl. ............... 29/200 B, 29/237, 29/454, 29/DIG. 3, 29/DIG. 32, 285/227
[51] Int. Cl. .................. B23p 19/00, B23p 19/04
[58] Field of Search ............... 29/200 B, 237, 454, 29/200 R, DIG. 3, DIG. 32, 400 D; 285/227

[56] References Cited
UNITED STATES PATENTS
2,965,961  12/1960  Schindler et al. .................. 29/454

Primary Examiner—Thomas H. Eager
Attorney—William C. Babcock

[57] ABSTRACT

A tool for use in forming a flare on the end portion of a length of tubing after a ferrule has been mounted on said end portion.

1 Claim, 14 Drawing Figures

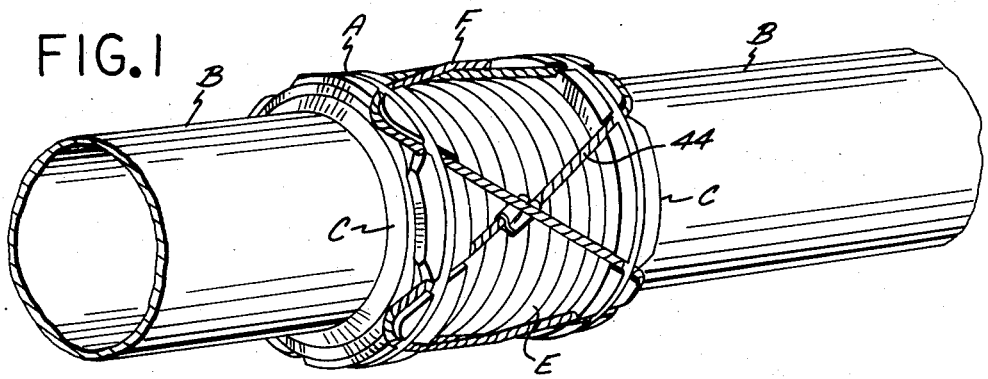
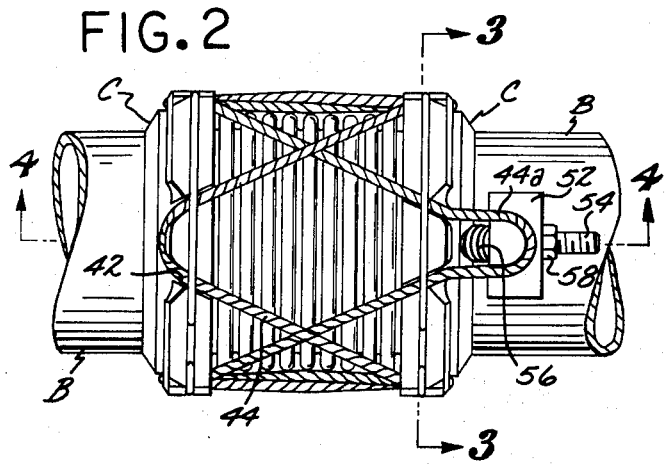
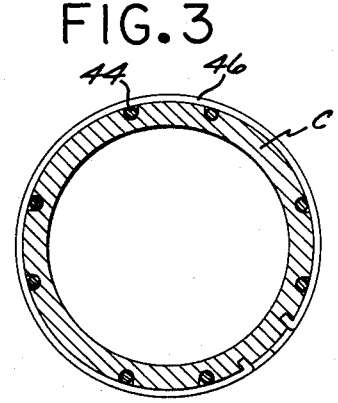
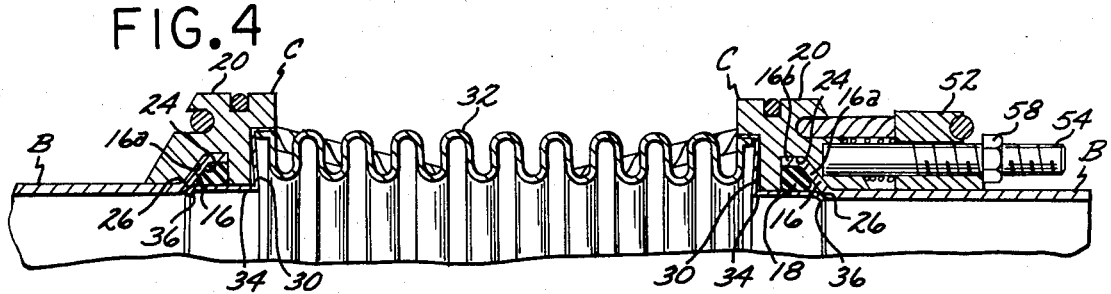
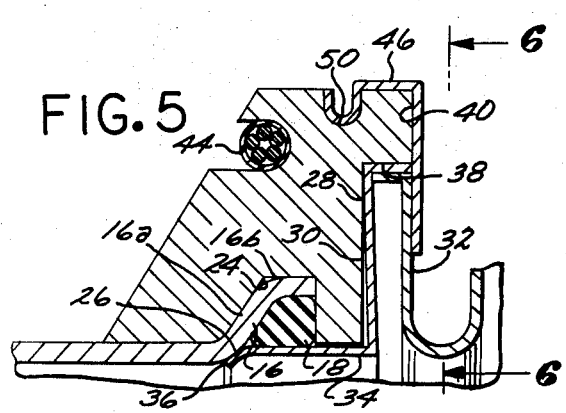
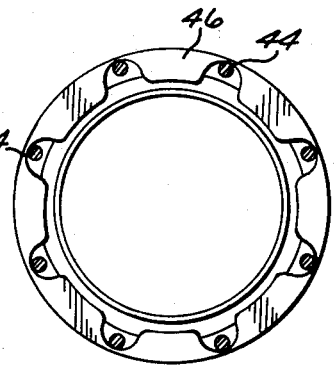

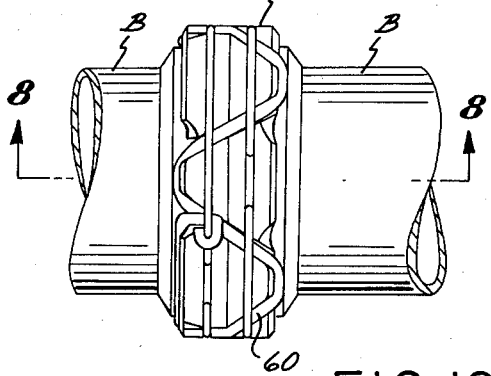
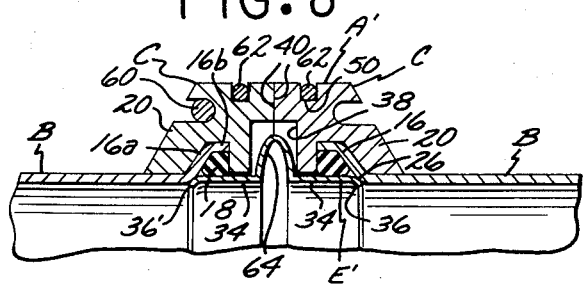
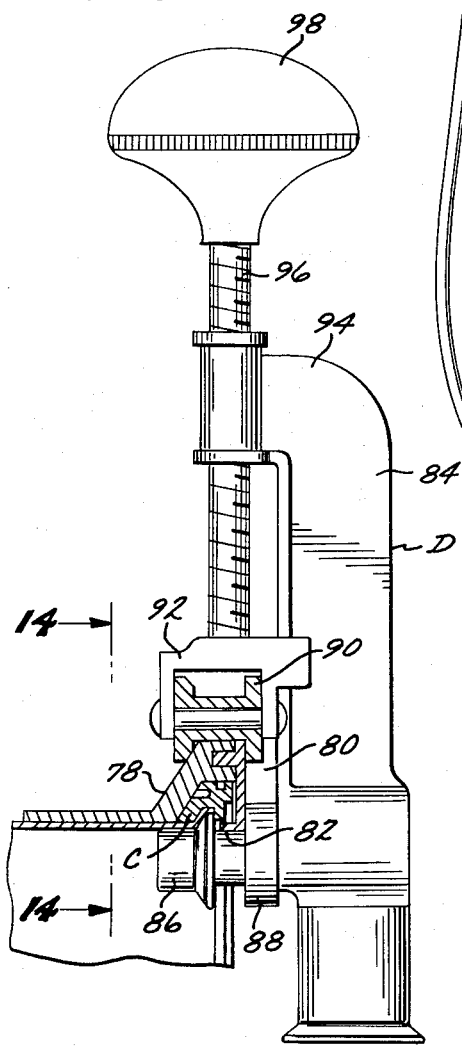
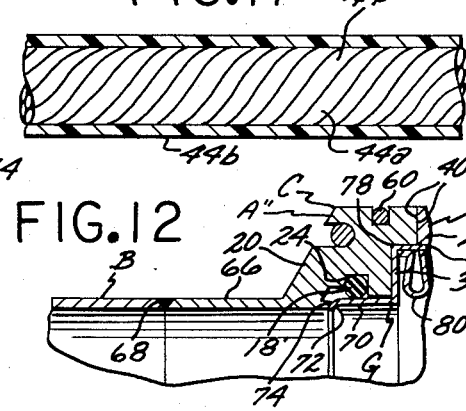
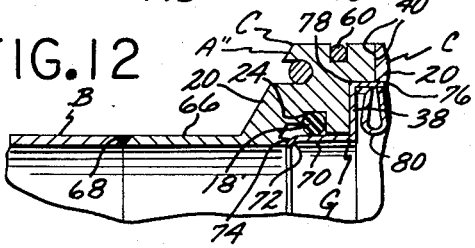
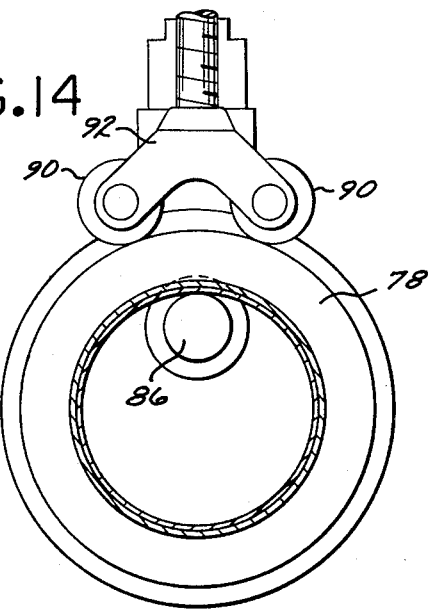

TUBING FLARING TOOL

This is a division of application Ser. No. 2,470, filed Jan. 13, 1970 that issued as U.S. Pat. No. 3,647,246 on Mar. 7, 1972.

BACKGROUND OF THE INVENTION

1. Field of the Invention

Tubing coupling and tubing flaring tool for use therewith.

2. Description of the Prior Art

The effective connecting of fluid carrying lines that may be misaligned and subject to substantial temperature variations has in the past presented a severe problem for which no truly satisfactory solution had been achieved prior to the present invention. The present invention provides a coupling that may be used to removably connect the adjacent end portions of two lengths of tubing that may be misaligned and subject to longitudinal movement due to temperature variations and overcomes the operation deficiencies of prior art devices used for this purpose.

SUMMARY OF THE INVENTION

A coupling of either fixed or flexible structure that includes two ferrules and a resilient tubular connector. The ferrules are secured to the adjacent end portions of two lengths of tubing, with the connector extending between the ferrules and effecting primary surface seals with said end portions. Two resilient rings are operatively associated with said ferrules, connector, and end portions of said tubing in such a manner as to effect secondary seals therewith. The ferrules are slotted and removably engaged by a pliable cable or marcelled high tensile strength wire to prevent longitudinal separation of the ferrules when the coupling is subjected to high internal pressure, with resultant breaking of the primary seals.

The primary object of the invention is to provide a tool for easily and conveniently flaring an end portion of a length of tubing after a ferrule has been mounted on said end portion.

BRIEF DESCRIPTION OF THE DRAWINGS

FIG. 1 is a perspective view of a first form of a coupling of flexible structure connecting two axially aligned lengths of tubing;

FIG. 2 is a top plan view of the first form of coupling shown in FIG. 1.

FIG. 3 is a transverse cross-sectional view of the first form of coupling taken on the line 3—3 of FIG. 1;

FIG. 4 is a longitudinal cross-sectional view of the first form of coupling taken on the line 4—4 of FIG. 2;

FIG. 5 is a fragmentary enlarged longitudinal cross-sectional view of one of the ferrules and bellows used in the first form of the coupling and illustrating an alternate form of sealing ring;

FIG. 6 is a front elevational view of the portion of the ferrule shown in FIG. 5, and taken on the line 6—6 thereof;

FIG. 7 is a side elevational view of a second form of coupling of rigid structure connecting the adjacent end portions of two lengths of tubing;

FIG. 8 is a longitudinal cross-sectional view of the second form of coupling taken on the line 8—8 of FIG. 7;

FIG. 9 is a side elevational view of an end portion of marcelled wire used in holding the ferrules of the second form of coupling together as shown in FIGS. 7 and 8;

FIG. 10 is a perspective view of an endless plastic covered cable loop used in maintaining the marcelled wire in a ferrule engaging position as shown in FIG. 7;

FIG. 11 is a longitudinal cross-sectional view of a section of the cable shown in FIG. 10 and taken on the line 11—11 thereof;

FIG. 12 is a longitudinal cross-sectional view of a third form of the coupling;

FIG. 13 is a side elevational view of a tool for forming an end portion of tubing into a flare that interlocks with one of said ferrules; and FIG. 14 is a front elevational view of the tool shown in FIG. 13 taken on the line 14—14 thereof.

DESCRIPTION OF THE PREFERRED EMBODIMENTS

The first form A of the coupling as may best be seen in FIGS. 1 to 4 is adapted to establish a flexible connection between adjacently disposed ends of first and second lengths of tubing B. The first form A of the coupling includes first and second ferrules C that interlock with circumferentially extending first and second flares 16 formed on the adjacent ends of the first and second lengths of tubing B by use of the tool D shown in FIGS. 13 and 14.

A tubular connector E in the form of a resilient bellows extends between first and second ferrules C and effects primary metal to metal seals with first and second flares 16 as may be seen in detail in FIGS. 4 and 5. First and second ferrules C have resilient sealing rings 18 associated therewith that effect secondary seals between the connector E, the flares 16, and the ferrules. An alternate form of sealing ring 18' is illustrated in FIG. 5 that has a transverse cross section that defines three lobes. Connector E is formed from a resilient sheet material and may flex both longitudinally and transversely to permit limited movement of the first and second lengths of tubing relative to one another. The first and second ferrules C in the first form A of the coupling are removably connected by a pliable cable F as shown in FIG. 1 to prevent inadvertent longitudinal separation of the ferrules, as well as to maintain a desired pressure contact at the primary seals.

Each of the ferrules C is defined by a ring shaped rigid body 20 that has a bore 22 extending longitudinally therethrough. Said 22 bore is of such diameter as to slidably and snugly engage the exterior surface of one of the lengths of tubing. Each body 20 has a circumferentially extending first recess 24 therein that extends outwardly from bore 22.

Each flare 16 is defined by a first circumferential section 16a of the tubing that extends forwardly and outwardly and develops into a second section 16b that is substantially parallel to the non-flared portion of a length of tubing B. Each flare 16 defines a circumferentially extending, interior, longitudinally curved surface 26 the purpose of which will later be explained. Each recess 24 is of such shape as to substantially engage the entire exterior surface of one of the flares 16, when the flare is formed therein by the use of the tool D shown in FIGS. 13 and 14.

Connector E as may best be seen in FIG. 4 includes two circular end sections 28 that have ring shaped walls 30 that taper towards one another at a slight angle. Connector E between end sections 28 is in the form of a bellows 32 which on its ends is sealingly connected to the end sections 28 by conventional means such as soldering, brazing, welding or the like not shown. Walls 30 have cylindrical shells 34 of substantially lesser diameter projecting outwardly therefrom. The shells 34 terminate in circumferentially inwardly extending, curved extremities 36 that pressure contact the surface 26 to effect metal to metal primary seals therewith. End sections 28 are disposed in circumferentially extending second recesses 38 formed in the adjacent end surfaces 40 of ferrules C.

The ferrules C as shown in FIG. 1 have a number of angularly disposed, circumferentially spaced slots 42 therein that are engaged by an endless loop of pliable cable 44, which loop is shown in FIG. 11. The cable 44 is laced into the slots 42 in a criss-cross pattern and defines a sequence of FIG. 8's as the cable extends around the ferrules C. The cable 44 is tensioned sufficiently to maintain surfaces 26 and end extremities 36 in desired pressure contact to effect said primary surface to surface seals. In FIG. 4 it will be noted that walls 30 are outwardly disposed in the second recesses 38 to assure surfaces 26 and end extremities 36 being in pressure sealing contact when the cable 44 is tensioned. The bellows 32 of connector C may be of two ply construction as shown in FIG. 5 if desired. Inadvertent displacement of the cable 44 from slots 42 and ferrules C from connector E is prevented by notched resilient rings 46 as shown in FIG. 5 that engage the exterior circumferential surfaces 48 of the ferrules and extend into circumferential grooves 50 formed therein. Rings 46 extend inwardly over end surfaces 40 of the ferrules C and surfaces 32a of bellows.

Uniform tension may be maintained on cable 44 by causing a loop 44a thereof to removably engage a slotted block 52 that is slidably mounted on a threaded rod 54 that extends outwardly from second ferrule C as shown in FIG. 2. A compressed helical spring 56 encircles rod 54 and has the abutting ends thereof in contact with second ferrule C and block 52. Rod 54 is engaged by a nut 58 that adjustably limits the outward positioning of block 52 relative to second ferrule C. By adjusting nut 58 on rod 54 the tension on cable 44 may be increased or decreased, and the pressure sealing contact between surfaces 26 and end extremities 36 controlled. The resilient rings 18 are in sealing engagement with the external surfaces of shells 34, flares 16, and ferrules C as shown in FIG. 4 and effect secondary seals between connector E and first and second lengths of tubing B.

The resilient sealing ring 18 may be of either the circular transverse cross section shown in FIG. 5 or the three lobe cross section illustrated in FIG. 12. A sealing ring of the last mentioned transverse cross section is identified by the numeral 18'. Cable 44 as shown in FIG. 11 is formed from a number of strands 44a of a material having a high tensile strength, and the strands being enveloped by a plastic sheath 44b, when the cable 44 is to be used on a coupling A that is subjected to high temperature conditions, the cable is preferably impregnated with molybdenum disulfide. The coupling A above described has been found to successfully maintain a seal with ± 10° axial misalignment and 1 inch axially travel.

The first and second ferrules C when mounted on the adjacent ends of first and second lengths of tubing B as previously described may be used to partially define a second form of coupling A' that is of rigid structure. In the second form of coupling A' as illustrated in FIGS. 7 and 8 the ferrules C have the end surfaces 40 held in abutting contact by a band of marcelled wire 60 of high tensile strength that engages the slots 42. Wire 60 is locked in slots 42 by the snap rings 62 that removably engage the circumferential grooves 50 formed on the exterior surfaces of the ferrules C.

The second form of coupling A' includes a connector E' that has two longitudinally spaced tubular shells 34' which on their adjacent ends are connected by an outwardly bowed tubular segment 64 that is longitudinally deformed in a direction to force end extremities 36' into pressure sealing contact with suraces 26. The outwardly bowed segment 64 extends into an annulus shaped space in the interior of the ferrules C that is defined by the two second recesses 38. Resilient rings 18 engage the shells 34' and cooperate with the flares 16 and ferrules C to provide secondary seals in the same manner as in the first form A of the coupling. Second form A' of the coupling operates in the same manner as the first form A, but with the exception that the second form permits no longitudinal or transverse movement of the two lengths of tubing B relative to one another.

A third form A'' of the coupling is shown in FIG. 12 in which the first and second ferrules C have tubular extensions 66 ppojecting therefrom that are welded or brazed to ends 68 of the two lengths of tubing B. The ferrules C have the end surfaces 40 held in abutting contact in the third form of coupling A'' in the same manner as described in the second form A'.

A tubular connector G is provided for the third form A'' of the coupling. Connector G includes two longitudinally spaced cylindrical shells 70 that on their outer ends develop into inwardly curved extremities 72 that are in pressure sealing contact with circumferential longitudinally curved surfaces 74 defined in the interior of the ferrules C as shown in FIG. 12.

The adjacent ends of the shells 70 develop into an outwardly projecting portion 76 that is longitudinally stressed to force end extremities 72 into pressure sealing contact with surfaces 74. Outwardly projecting portion 76 in tranverse cross section is defined by two L-shaped segments 78 that are connected on their adjacent ends by an inwardly extending loop 80. Sealing rings 18' are disposed in first recesses 24 as may be seen in FIG. 12 and pressure contact shells 70 and ferrules C to provide secondary seals in the third form A'' of the coupling. The wire 60 is used in the third form A'' of the coupling to hold the ferrules C together in abutting relationship as described in connection with the second form A'.

The tool D shown in FIGS. 13 and 14 is used to form a flare 16 on an end portion of a length of tubing B after a ferrule C has been mounted on said end portion. A first circular die 78 is slidably mounted on tubing B and moved to a position adjacent to an end thereof. A second circular die 80 interlocks with the first die 78. The dies 78 and 80 grip a ferrule C therebetween. Second die 80 has a stop 82 thereon that is contacted by the end of tubing B that is adjacent to the circumferential segment thereof that is to be formed into the flare 16. By use of the stop 82, a circumferential segment of the tubing B of the correct length to form the flare 16 is disposed in radial alignment with first recess 24.

Tool D includes an elongate body 84 that rotatably supports a first flare forming roller 86 and second roller 88 in fixed longitudinal spacing. Roller 86 has an external surface of the same configuration as the interior surface of flare 16. First roller 86 engages the interior surface of an end section of tubing B, and second roller 88 engages the end surface 40 of ferrule B.

Two spaced spools 90 rotatably engage the exterior surfaces of first and second dies 78 and 80 and serve to removably hold them together in interlocking relationship. Spools 90 are rotatably supported on the lower end of a rigid body 92. The body 92 and spools 90 are longitudinally movable relative to body 84.

The body 84 includes a forwardly extending portion 94 in which a tapped bore (not shown) is formed that is engaged by a threaded rod 96. One end of rod 96 is journalled in body 92, and the other end of the rod supports a handle 98. When rod 96 is rotated in an appropriate direction the distance between rollers 86 and 88, and the spools 90 is shortened, with first roller 84 forcing an end segment of tubing B into first recess 24 to form said segment into flare 16. The tool D is now rotated one revolution relative to tubing B to form a circumferentially extending flare 16 on the tubing that extends into the first recess 24. The flare 16 so formed locks the ferrule C on one end of a length of tubing B. After the flare 16 is formed as above described, the handle is rotated in a direction to increase the distance between spools 90 and the rollers 86 and 88 to permit the tool D to be separated from the tubing B.

I claim:

1. A tool for forming a flare on an end portion of a length of tubing to extend into a circumferentially extending recess defined on the interior of a ring shaped ferrule to lock said ferrule to said tubing, said tool including:
   a. a first tubular die slidable mounted on the exterior surface of said tubing adjacent to an end thereof that contacts a first surface of said ferrule;
   b. a second circular die that slidably interlocks with said first die, said second die in abutting contact with a second surface of said ferrule, and said second die including a stop to limit the length of the end portion of said tubing that can be formed into said flare;
   c. a first roller disposed inside said tubing, said first roller of such configuration as to cooperate with said recess to form said flare in said recess;
   d. a second roller longitudinally spaced from said first roller, with said first and second rollers gripping portions of said ferrule and second die therebetween;
   e. a rotatable spool that engages the exterior end surfaces of said first and second dies to maintain them in interlocking engagement;
   f. first means for lessening the distance between said spool and said first and second rollers to force an end portion of said tubing into said recess to define said flare; and
   g. second means for concurrently rotating said spool and first and second rollers relative to said tubing and first and second dies to form a circumferentially extending flare on said tubing that is disposed in said recess and interlocks said ferrule to said tubing.

* * * * *